(12) United States Patent
Tang

(10) Patent No.: US 7,055,794 B1
(45) Date of Patent: Jun. 6, 2006

(54) AIR SUCTION VALVE FOR STORAGE BAG

(76) Inventor: Wen-Chin Tang, 12F, No. 356, Ming Chih Rd.,Tai Shan Hsinag, Taipei Hsien (TW)

( * ) Notice: Subject to any disclaimer, the term of this patent is extended or adjusted under 35 U.S.C. 154(b) by 0 days.

(21) Appl. No.: 11/002,109

(22) Filed: Dec. 3, 2004

(51) Int. Cl.
*F16K 31/44* (2006.01)
(52) U.S. Cl. .......................... 251/82; 251/95; 251/100
(58) Field of Classification Search ................ 251/82, 251/95, 100
See application file for complete search history.

(56) References Cited

U.S. PATENT DOCUMENTS 2,772,692 A * 12/1956 Russell ...................... 137/223
6,508,264 B1 * 1/2003 Chaffee ...................... 137/223
2004/0232368 A1 * 11/2004 Motonaka et al. .......... 251/100

\* cited by examiner

*Primary Examiner*—Justine R. Yu
*Assistant Examiner*—Andrew J. Rost
(74) *Attorney, Agent, or Firm*—Dennison, Schultz, Dougherty & MacDonald

(57) ABSTRACT

An air suction valve for storage bag includes a body, a flat valve, a control knob and a lid; the body containing an air duct, a port below the air duct to be closed by the plate valve; the control knob being provided on the plate valve to engage longitudinal displacement to control the plate valve to descend to shut off or to ascend to open up; the lid in relation to the air duct being adapted to the control knob and provided with a air suction port; and an assembly gap being formed to the air suction port to connect through the atmosphere.

8 Claims, 6 Drawing Sheets

AIR SUCTION VALVE FOR STORAGE BAG

BACKGROUND OF THE INVENTION (a) Field of the Invention

The present invention is related to an air suction valve, and more particularly, to one that is applied in a bag for the storage of clothes or bed quilt.

(b) Description of the Prior Art

Whereas bags for storage of clothes and bed quilts generally available in the market are designed to save storage space by expelling excessive air in the bags to reduce their sizes, an air discharge device is adapted to expel the excessive air in the bag. The air discharge device of the prior art relates to air discharge gap and port provided on the bag for the user to expel the excessive air in the bag by squeezing the bag, a device usually applied in a summary or travel bag. Alternatively, an air suction valve is adapted to the storage bag for connection to a vacuum cleaner to fast suck the air in the bag.

The design of the air suction valve of the storage bag that connected to the flexible hose of a vacuum cleaner relates to a one-way flat valve provided at the port. The flat valve permits that only the air is sucked from within the bag. Upon the air is completely sucked, there is no more air to pass through the vacuum machine. Lacking in the feeding of cooling air, the motor of the vacuum cleaner could be easily burnt out. Besides, higher end clothes stored in bag vacuumed are vulnerable to deteriorated fabrics or aged, crisped or discolored fibers after a given time of storage.

SUMMARY OF THE INVENTION

The primary purpose of the present invention is to provide an air suction valve for storage bag that prevents complete suction of air by the vacuum cleaner, thus to avoid burnt out of motor in the vacuum cleaner while leaving a proper amount of residual air to protect the fabrics and the fibers of the clothes in the bag from deterioration, aging, becoming crisp or discolored.

DETAILED DESCRIPTION OF THE PREFERRED EMBODIMENTS

Figure 1:
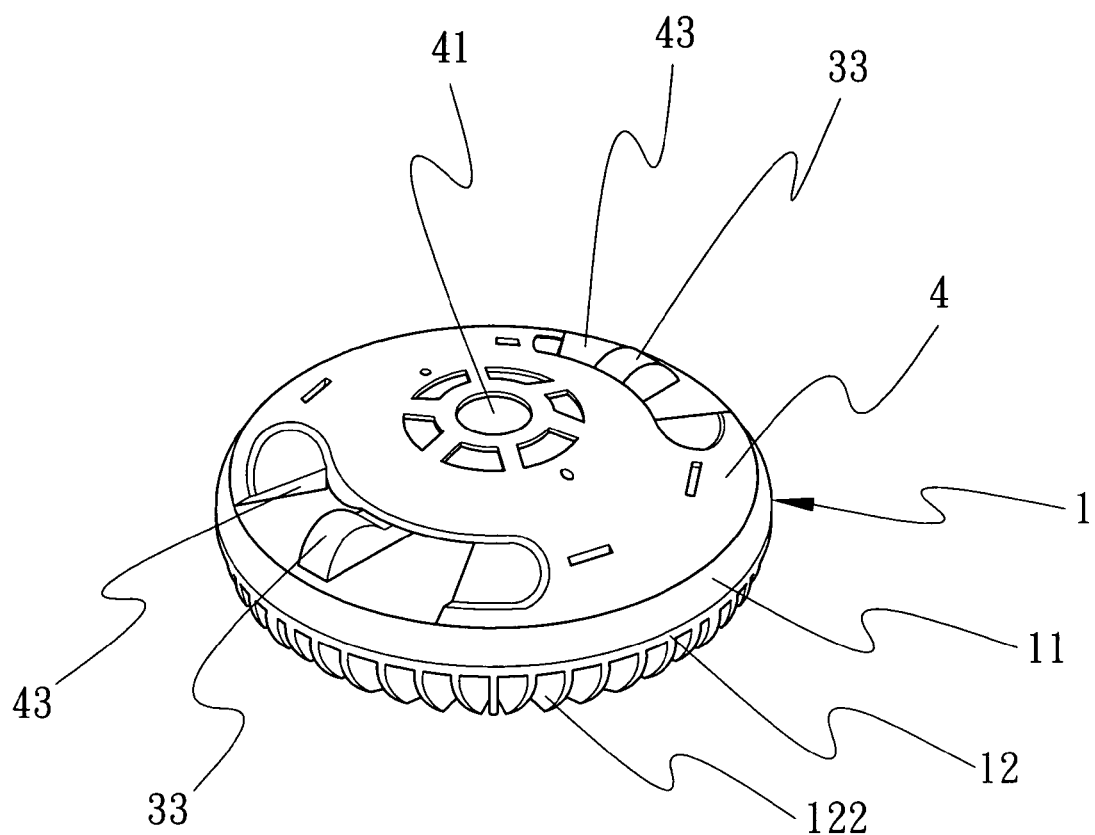
FIG. 1 is a perspective view of the present invention as assembled.
Figure 2:
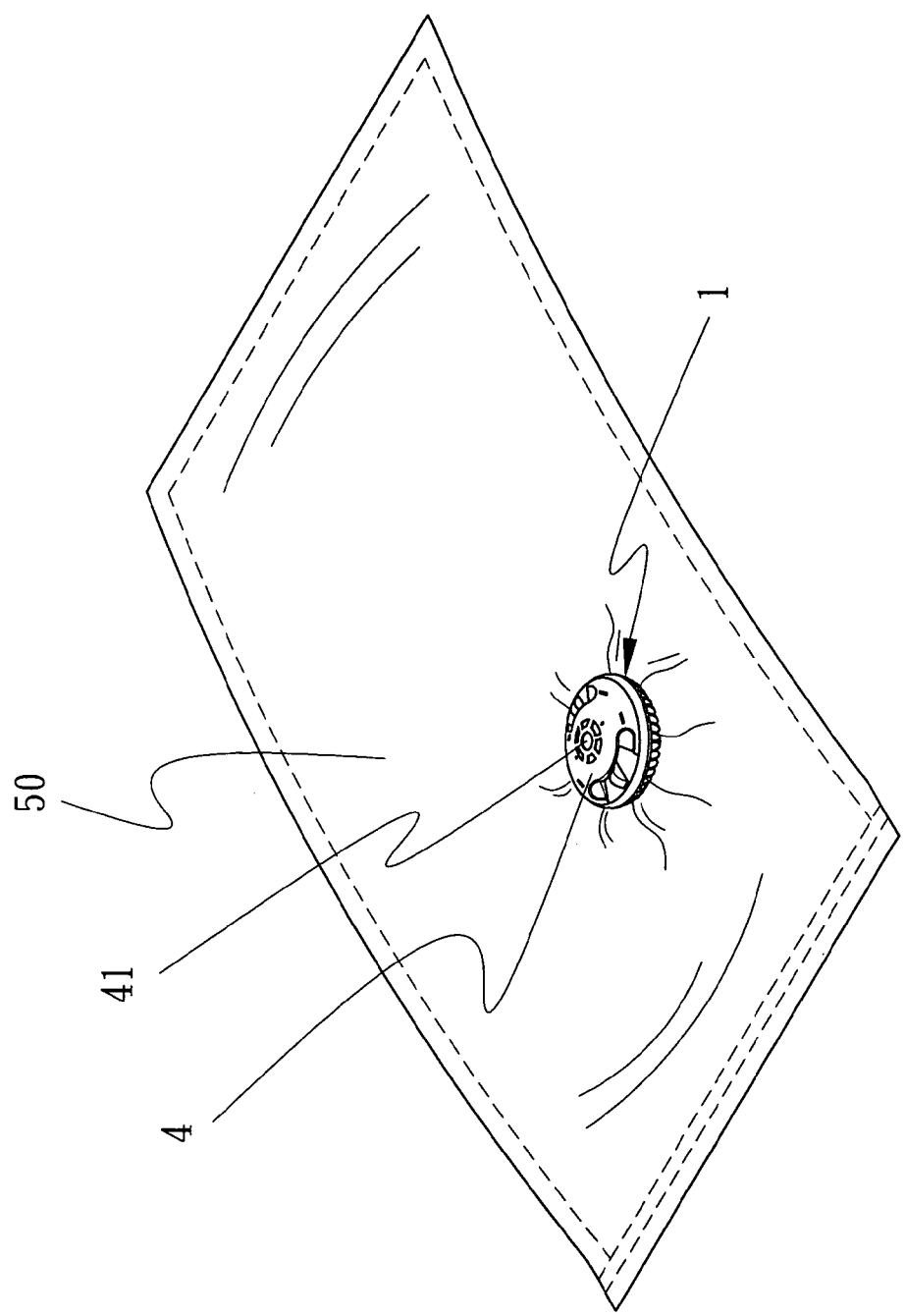
FIG. 2 is a perspective view of the present invention adapted to a storage bag.
Figure 3:
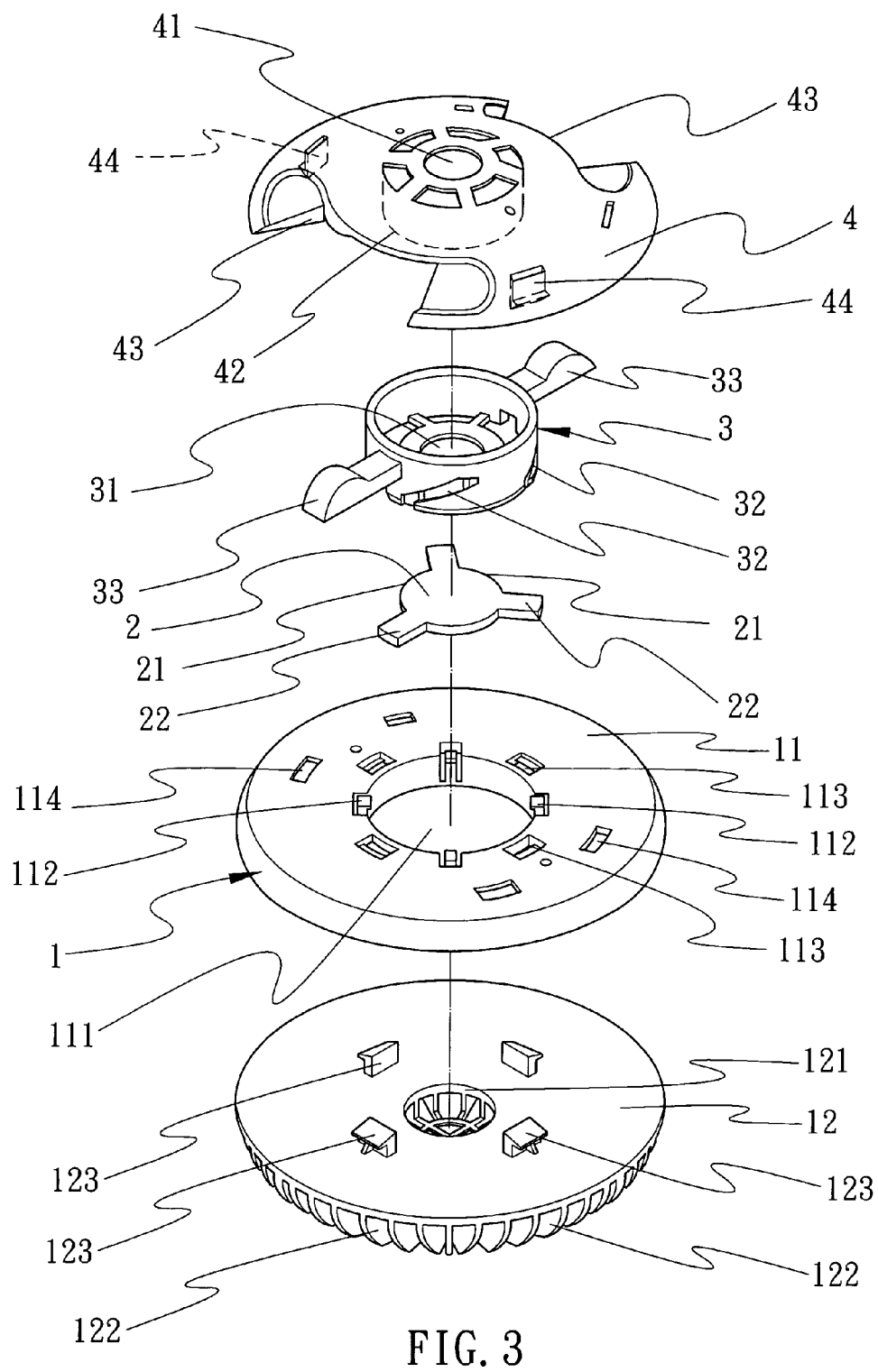
FIG. 3 is an exploded view of the present invention.

Referring to FIGS. 1, 2, and 3, a preferred embodiment of the present invention adapted to a storage bag 50 is comprised of a valve body 1, a flat valve 2, a control knob 3, and a lid 4.

Figure 4:
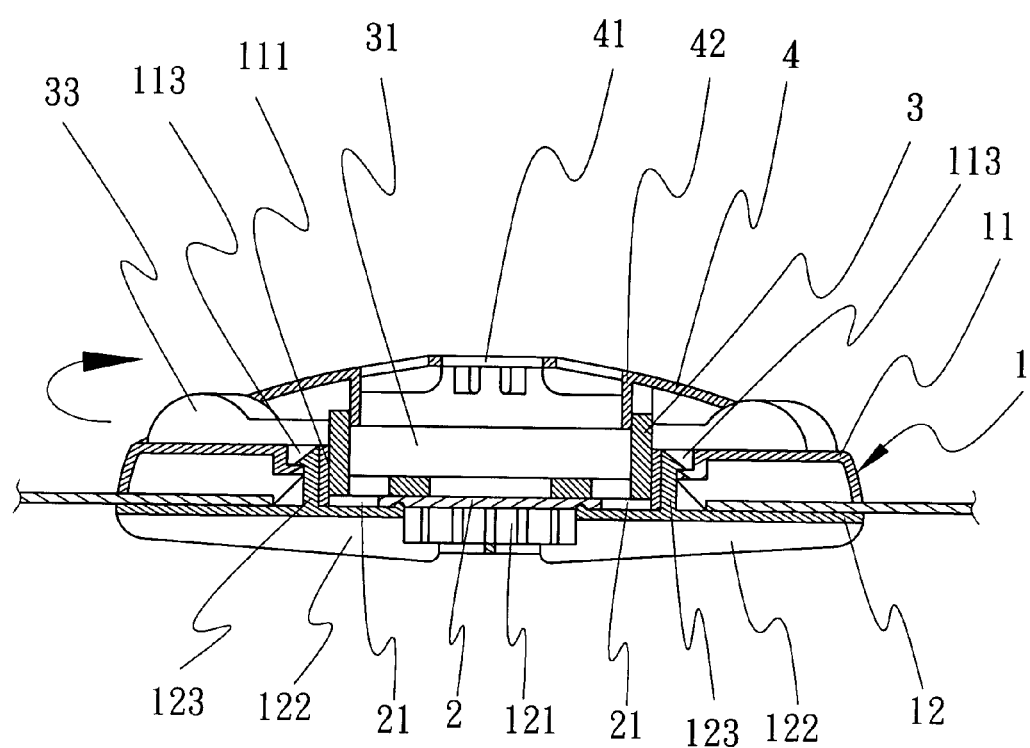
FIG. 4 is a sectional view of the present invention.

Wherein, the valve body 1 relates to a disk structure disposed at a selected location on the bag 50 as illustrated in FIGS. 2 and 3. The valve body 1 contains an air duct 111; a port 121 in a diameter slightly smaller than that of the air duct 111 is provided below the air duct 111; and both of the air duct 111 and the port 121 are connected through the interior of the bag 50. The air duct 111 is disposed at the center of an upper plate 11 as illustrated in FIG. 3, and multiple protruded bits 112 extending inwardly are provided from the sidewall surrounding the air duct 111 for the assembly of the control knob 3 to the valve body 1. The port 121 is disposed at the center of a lower plate 12 as illustrated in FIG. 3, and multiple ribs 122 are provided to the bottom of the lower plate 12 to prevent the bag 50 from attaching to where below the port 121 thus to allow smooth flow of the air to be pumped out through the port 121. Accordingly, the upper plate 11 is assembled to the lower plate 12 as illustrated in FIGS. 3 and 4 and the bag 50 is sandwiched between the upper and the lower plates 11, 12 to form a structure of having the air duct 111 and the port 121 below the air duct 111 of the valve body 1 connected through the bag 50. Alternatively, the valve body 1 is comprised of the upper plate 11 and the lower plate 12 by having multiple holes 113, 114 provided on the upper plate 11 to be locked by multiple corresponding latches 123 provided on the lower plate 12 as illustrated in FIG. 4.

The flat valve 2 as illustrated in FIG. 3 is related to a flexible plate, e.g., one made of rubber. Multiple recesses 21 are provided on the peripheral of the flat valve 2 to define multiple supports 22 for the flat valve 2 to be filled into the air duct 111 of the valve body 1 as illustrated in FIG. 4 to freely ascend or descend therein. Accordingly when the flat valve 2 descends, it shuts off the port 121.

Figure 5:
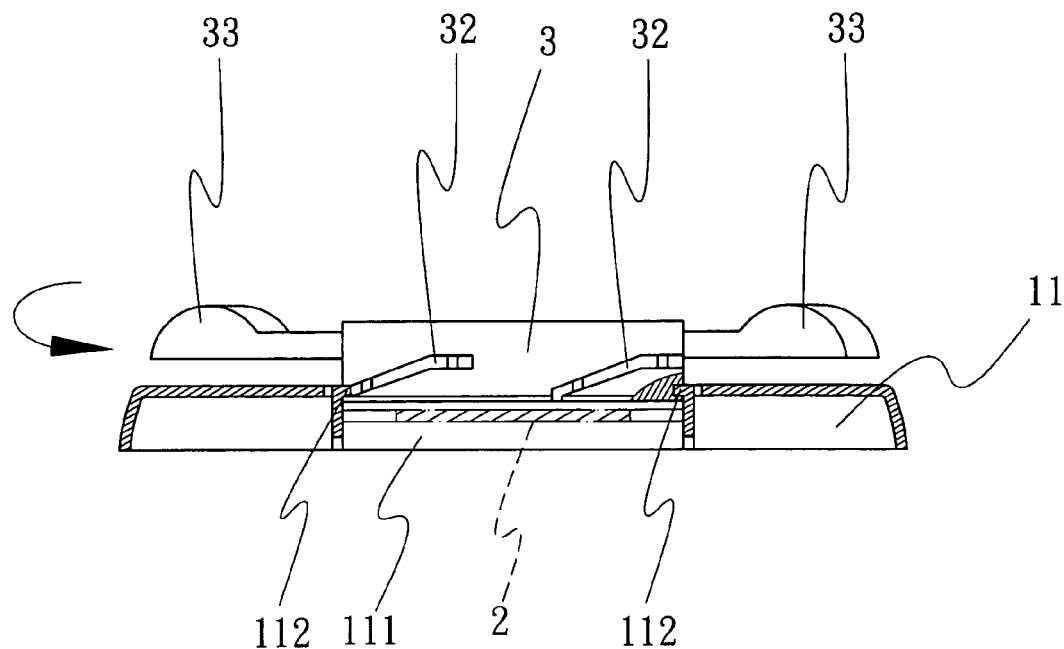
FIG. 5 is a schematic view showing the operation of a control knob in the present invention.
Figure 6:
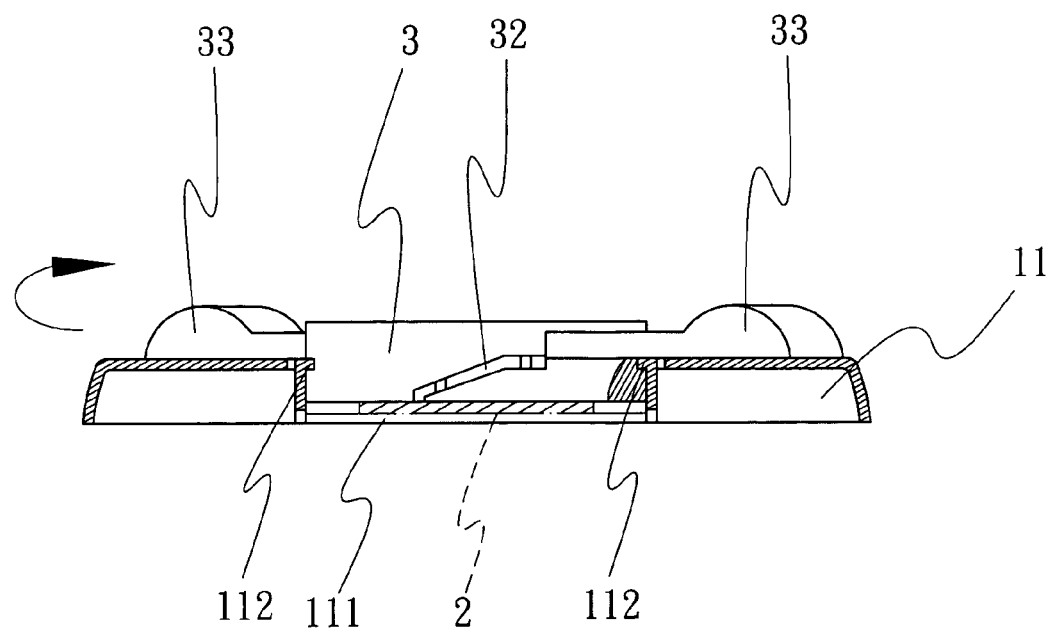
FIG. 6 is another schematic view showing the operation of a control knob in the present invention.

The control knob 3 as illustrated in FIG. 3 relates to a hollow ring containing an air discharge duct 31 and multiple chutes 32 disposed on the peripheral of the ring in relation to those protruded bits 112 on the upper plate 11. Two levers 33 are respectively extending from both sides of the ring to exercise control when twisted. With the control knob 3 disposed in the air duct 111 of the valve body 1 and those protruded bits 112 of the air duct 111 sticking into their respective chutes 32 as illustrated in FIGS. 5 and 6, the control knob 3 is assembled to exercise longitudinal displacement by taking advantage of those chutes 32. When the knob 3 is turned to rise, the flat valve 2 ascends to open up the port 121. On the contrary, when the knob 3 is turned to fall, the flat valve 2 descends to shut off the port 121.

The lid 4 as illustrated in FIGS. 3 and 4 is fixed to the valve body 1 at where above the control knob 3 is located. An air suction port 41 is provided at the center of the lid and a ring 42 is provided at where below the air suction port 41 in corresponding respectively to the air duct 111 and the air discharge duct 31 of the knob 3. As selected two sides of the lid 4, a slot 43 is each provided to allow the lever 33 of the knob 3 to stick out. Multiple latches 44 are disposed at where below the lid 4 for the lid 4 to be locked to those locking holes 114 provided on the upper plate 11 of the valve body 1, and the ring 42 below the air suction port 41 to be connected to the air discharge duct 31 of the control knob 3. An assembly gap to admit the ambient air is formed at where the ring 42 is connected to the air discharge duct 31.

The air suction valve comprised of the valve body 1, the flat valve 2, the control knob 3, and the lid 4 therefore permits an air suction device, e.g., a vacuum cleaner or an air pump to be placed at the air suction port 41 of the lid 4 to suck the air in the bag 50 as illustrated in FIGS. 1 and 2.

Figure 7:
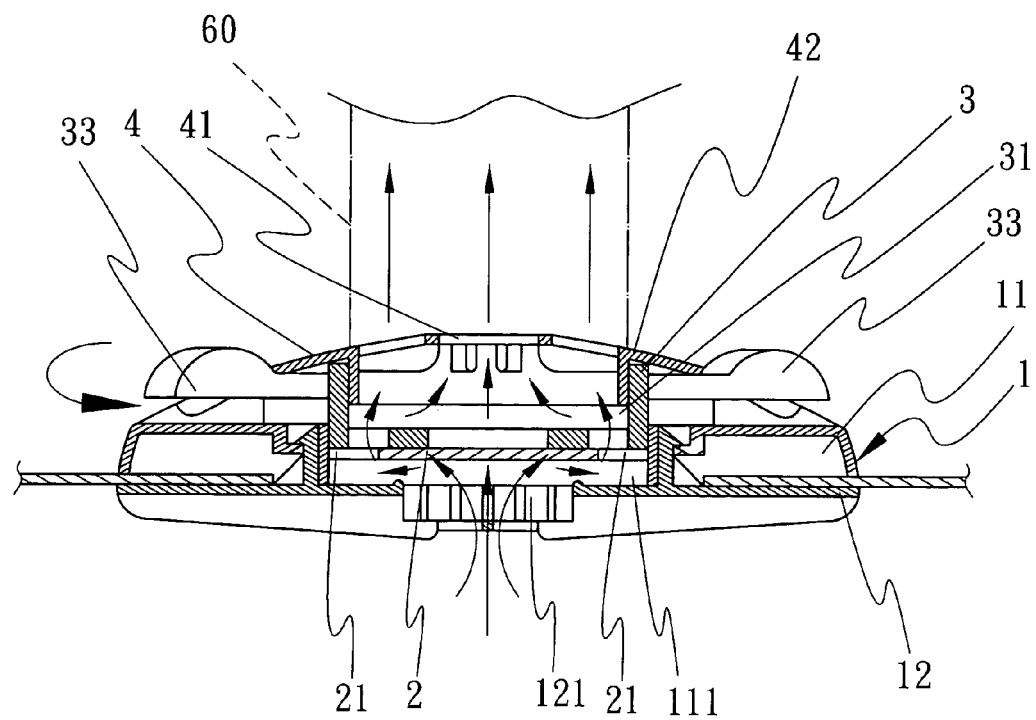
FIG. 7 is a schematic view showing the operation of an air suction device in the present invention.

In use, a user operates the levers 33 to turn the control valve for the control knob 3 to rise, thus for the flat valve 2 located below the control knob 3 to provide sufficient space for the flat valve 2 to ascend as illustrated in FIG. 5. Accordingly, an air suction device 60, e.g., a vacuum or an air pump is connected to the air suction port 41 of the lid 4 as illustrated in FIG. 7 to draw the air inside the bag 50. As the air in the bag 50 is sucked out, the flat valve 2 is forced to ascend to permit the air to be discharged through the port 121, the air duct 111, those recessed 21 of the flat valve 2, the air discharge duct 31 in the control knob 3, and the air suction port 41. While the air in the bag 50 is about to being completely sucked out, the ambient air re-enters into the bag through the assembly gap formed between the lid 4 and the control knob 3 into the air suction port 41 and to be sucked by the air suction device 60. Consequently, the present invention not only allows the suction of the air in the bag 50 but also supplies sufficient ambient air to cool the air suction device 60 thus to prevent the motor built in the air suction device 60 from getting overheated and burnt out.

Figure 8:
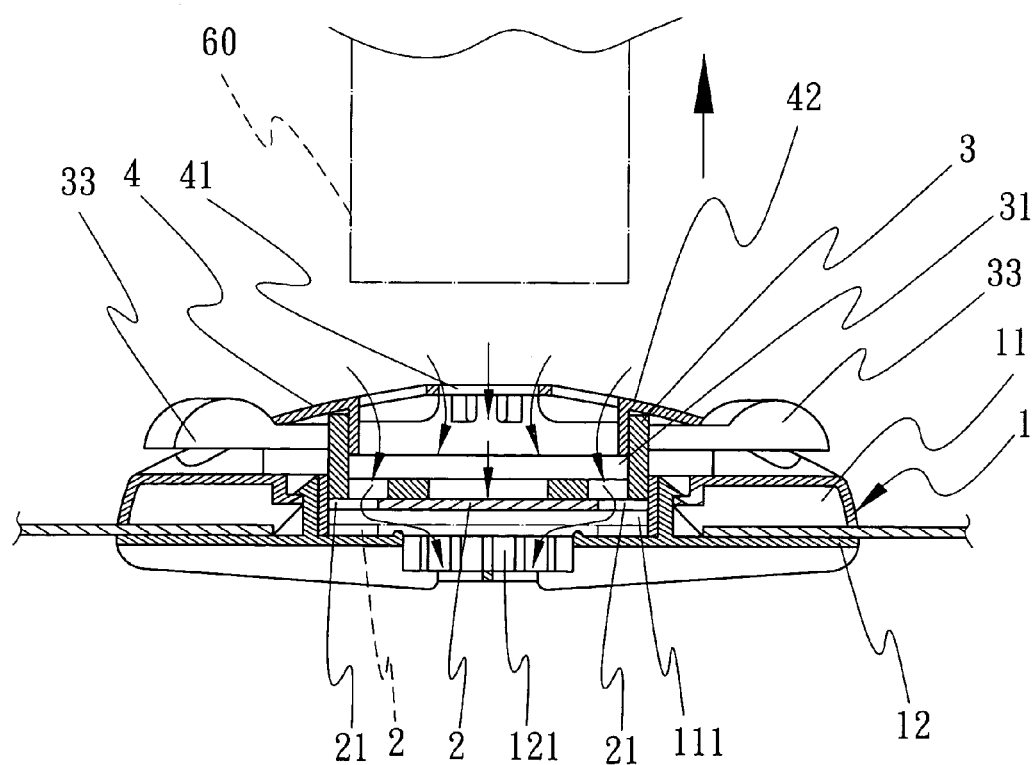
FIG. 8 is another schematic view showing the operation of the air suction device in the present invention.

Furthermore, once the aid in the bag 50 is completed sucked, the air suction device 60 is removed and the control knob descends by operating those levers 33 for the control knob 3 to descend as illustrated in FIG. 6 to shut off the port 121 of the valve body 1. A proper amount of ambient air is made up through the air duct 121 into the bag 50 that is not yet shut off before the descending of the flat valve 2 to block the flat valve 2 as illustrated in FIG. 8. The presence of ambient air in the bag 50 helps prevent deteriorated, aged, or hardened fibers of the clothes stored in the bag for a longer time, and thus to achieve the results of storage by compression and the protection of the clothes stored in the bag 50.

What is claimed is:

1. A storage bag air suction valve is comprised of a valve body, a flat valve, a control knob, and a lid; the air suction valve being assembled to the bag; and the air suction of the lid being used to draw out the air in the bag;

the valve body being fixed to the bag, containing an air duct, multiple protruded bits extending inwardly being provided on the sidewall surrounding the air duct, a port in a diameter slightly smaller than that of the air duct being disposed below the air duct, and both of the air duct and port being connected through the interior of the bag;

the flat valve being provided on its peripheral multiple recesses to admit flow of air, multiple supports being defined by those recesses, and the flat valve being filled in the air duct of the valve body to free descend to attach to the port;

the control knob contains a hollow ring, an air discharge duct being formed in the ring, multiple chutes being provided on the peripheral of the ring in relation to those protruded bits, the control knob being provided in the air duct of the valve body, those protruded bits of the air duct being stick into their respective chutes; and the control knob engaging in longitudinal displacement in the air duct; and the lid being fixed to the valve body at where above the control knob, and an air suction port being provided to the lid at where in relation to the air duct and the air discharge duct of the control knob.

2. The storage bag air suction valve of claim 1, wherein; the air duct is provided at the center of an upper plate, the port is provided at the center of a lower plate, and the bag is sandwiched by both plates.

3. The storage bag air suction valve of claim 2, wherein; the multiple locking holes are provide on the upper plate and multiple corresponding latches are provided on the lower plate for both plates to be locked to each other.

4. The storage bag air suction valve of claim 2, wherein; multiple ribs are provided to the lower plate to prevent the port from being blocked by the bag.

5. The storage bag air suction valve of claim 1, wherein; the control knob includes a lever each sticking out of the lid on both sides of the ring for control by turning.

6. The storage bag air suction valve of claim 5, wherein; the lid includes a slot each provided on both sides of the lid to permit the levers of the control knob to stick out.

7. The storage bag air suction valve of claim 1, wherein; the lid includes a protruded ring provided at where below the air suction port to connect the lid to the air discharge duct of the control knob.

8. The storage bag air suction valve of claim 1, wherein; the lid includes multiple latches to lock to the body of the valve.

\* \* \* \* \*